A. R. FINKELSTEIN.
AUTOMOBILE GUARD.
APPLICATION FILED FEB. 4, 1914.
1,104,647.
Patented July 21, 1914.
2 SHEETS—SHEET 1.
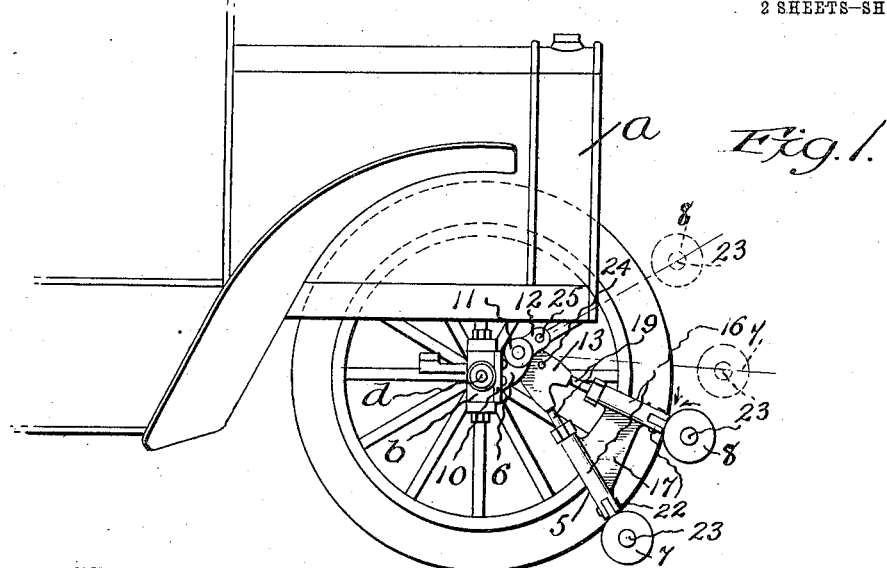
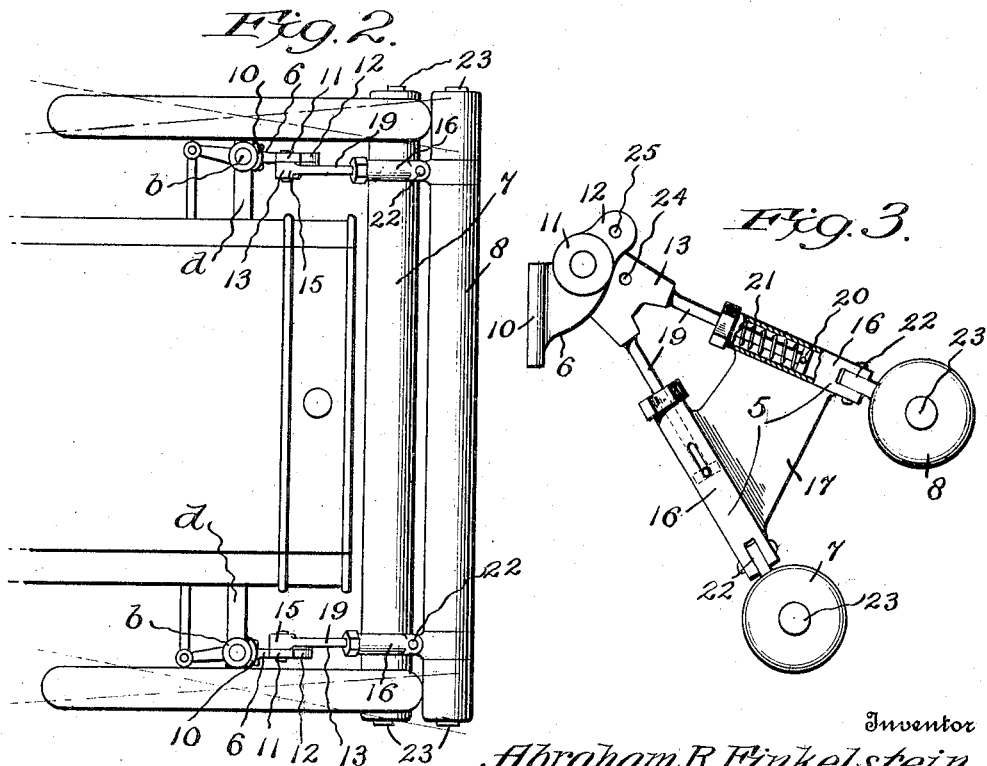
Inventor
Abraham R. Finkelstein,
By Victor J. Evans
Attorney
Witnesses

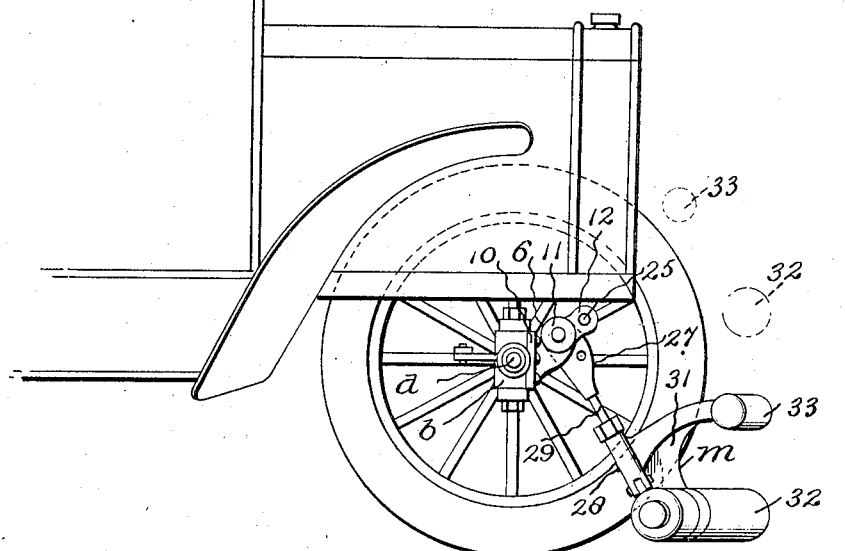
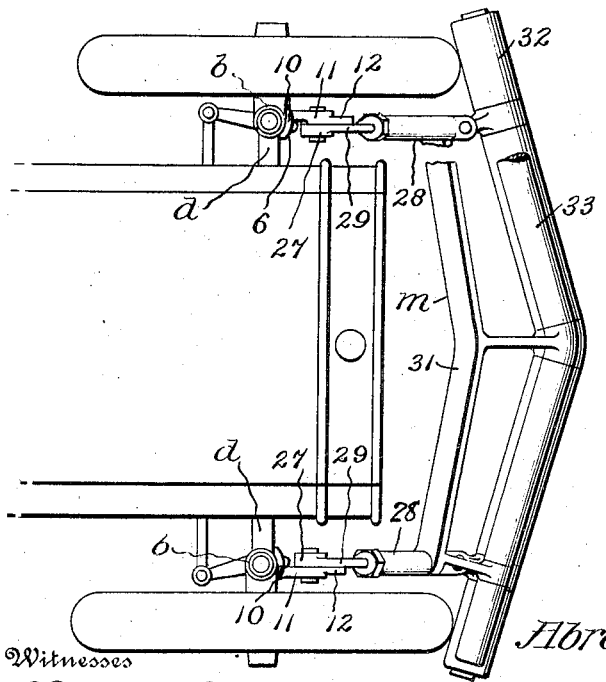
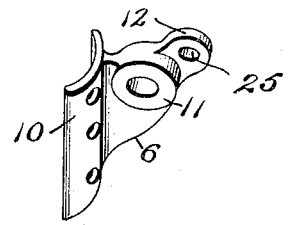

UNITED STATES PATENT OFFICE.

ABRAHAM R. FINKELSTEIN, OF BROOKLYN, NEW YORK.

AUTOMOBILE-GUARD.

1,104,647.     Specification of Letters Patent.     Patented July 21, 1914.

Application filed February 4, 1914. Serial No. 816,451.

*To all whom it may concern:*

Be it known that I, ABRAHAM R. FINKELSTEIN, a citizen of the United States, residing at Brooklyn, in the county of Kings and State of New York, have invented new and useful Improvements in Automobile-Guards, of which the following is a specification.

The general object of this invention is to improve the construction of automobile fenders in point of promoting the general efficiency of the same.

Another object is the provision of a fender, whereby an object may be rolled away from in front of a vehicle and thus be removed from the path thereof. And to these ends the invention consists of a frame pivotally connected to the front of the vehicle and rotating elements mounted on the end of the frame for contacting with the vehicle wheels.

Other objects will appear and be better understood from that embodiment of my invention of which the following is a specification, reference being had to the accompanying drawings forming part hereof, in which:—

Figure 1 is a side view of my fender in position on the front portion of an automobile. Fig. 2 is a top plan view of Fig. 1. Fig. 3 is a side view of my invention detached from the vehicle. Fig. 4 is a side view of a modified form of the invention in position on an automobile. Fig. 5 is a top plan view of Fig. 4. Fig. 6 is a detail perspective view of a bracket for attaching the fender to the steering knuckle of the vehicle.

As shown in the drawings the device consists of the supporting arms 5, the attaching brackets 6, and the rollers 7 and 8 which are mounted at the ends of the arms 5 and which are formed of any suitable material and preferably covered with rubber or the like.

$a$ indicates the motor of the automobile to which the device is applied.

The brackets 6 may be formed of any suitable material, such as iron, steel, or the like, and are provided with an attaching portion 10, which is shaped so as to be secured to the steering knuckle $b$ of the vehicle, as shown in Fig. 1. The brackets are also provided with an off-set bearing portion 11, and an obliquely-disposed ear 12; and it will be noted, by referring to Fig. 1, that the bearing 11 is not in horizontal alinement with the axle $d$ of the vehicle. The reason for this will be hereinafter fully explained.

As shown in Figs. 1, and 3 of the drawings the arms 5 are connected together by a web 17 and each arm 5 includes a tubular member 16 and a rod member 19, slidably mounted therein. The rods 19 are connected with head members 13. Heads 20 are provided upon the rods 19, and are located in the tubular members 16, and springs 21 are interposed between the said heads and the ends of the tubular members, as best shown in Fig. 3. The members 16 are provided with pivoted bearings 22 in which are mounted shafts 23 for carrying the rollers. The arms are adapted to be swung against the periphery of the wheels so that the rollers may be brought into contact with the wheels and thus are adapted to be actuated in a direction reverse to the direction of rotation of the wheel, and obviously will tend to roll away from the wheels any object which has inadvertently entered the path of the vehicle. The rollers are adapted to assume this position by virtue of the bearing 11 being located above the horizontal plane of the axle, the arms, when swung downwardly taking an eccentric motion and positioning the rollers in contact with the wheels, as shown. When it is desired to place the device in the inoperative position, the arms 5 are swung upwardly, to the position shown in dotted lines in Fig. 1, so that the hole 24 in the member 13, coincides with the hole 25 in the bracket 6; a suitable pin (not shown) may then be fitted in the holes for the purpose of supporting the bracket in its upper or inoperative position.

It will be noted that by virtue of the resilient telescoping structure of the supporting arms, these arms are adapted to vary in length with relation to the angle in which the wheel of the vehicle is steered; the rollers therefore are adapted to effect an angular movement when the wheels are steered and thus are in constant contact with the periphery of the wheel.

In the modified form of the invention which is shown in Figs. 4, 5 and 6, the brackets 6 are similar in shape and structure to the previously described form of the invention. The supporting member is shown in the form of a frame $m$ which is composed of two resiliently connected telescoping members 27 and 28; the member 27 is pivoted to the bracket 6 and, being eccentrically swung with relation to the axle d, is locked in the up position in a similar manner to that described in the preferred form of the invention. The member 27 is also provided with an obliquely disposed piston rod 29, which is slidingly fitted in the member 28, and is adapted to be normally positioned therein by a suitable spring, such as was previously described. The member 28 is provided with the web 31 which carries at its lower end the rollers 32, and the buffer 33 which is positioned in spaced relation with the roller and above the same. The rollers and buffer are preferably formed of a material suitably covered with rubber or the like, and are angular in shape as shown. The rollers are adapted to be actuated by the wheels of the vehicle, as before described, and by virtue of the angular shape of the same, they will sweep any obstacle away from the path of the vehicle.

It is obvious that those skilled in the art may vary the details of construction and arrangements of parts without departing from the spirit of my invention and therefore I do not wish to be limited to such features except as may be required by the claims.

What is claimed as new is:

1. In an automobile fender, the combination with the steering knuckles of the vehicle; of a telescoping frame pivotally carried by the steering knuckles, and rollers transversely mounted on the frame for contacting with the vehicle wheels.

2. In an automobile fender, the combination with the steering knuckles of the vehicle; of a telescoping frame pivotally carried by the steering knuckles, and adapted to be swung to an operative and an inoperative position, and rollers transversely mounted on the frame for contacting with the vehicle wheels when the frame is swung to its operative position.

3. In an automobile fender, the combination with the steering knuckles of the vehicle; of brackets secured to the knuckles, a telescoping frame pivotally carried by the said brackets and rollers rotatably carried by the frame and adapted to be actuated by the vehicle wheels substantially as described.

4. In an automobile fender, the combination with the steering knuckles of the vehicle; of brackets carried by the said knuckles, a telescoping frame pivotally carried by the said brackets and adapted to be swung to an operative and an inoperative position, means for locking the frame in the inoperative position, shafts mounted transversely on the frame, and rollers carried by the shafts and adapted to be actuated by the wheels of the vehicle substantially as described.

5. In an automobile fender, the combination with the steering knuckles of the vehicle; of brackets secured to the said knuckles, spring-pressed telescoping arms pivotally carried by the brackets and adapted to be swung thereon in eccentric relation to the axle of the vehicle, and further adapted to be locked in one position, transverse shafts pivotally carried by the arms, and rollers mounted on the shafts and adapted to be rotated by the wheels of the vehicle substantially as described.

In testimony whereof I affix my signature in presence of two witnesses.

ABRAHAM R. FINKELSTEIN.

Witnesses:
 JOHN A. DOMEGLY,
 GEO. A BYRNE.

---

Copies of this patent may be obtained for five cents each, by addressing the "Commissioner of Patents, Washington, D. C."